US006996918B2

(12) United States Patent
Bsirske et al.

(10) Patent No.: US 6,996,918 B2
(45) Date of Patent: Feb. 14, 2006

(54) DEVICE AND METHOD FOR TREATING A REFUSE MATERIAL CONTAINING HYDROCARBONS

(75) Inventors: Werner Bsirske, Traun (AT); Andreas Zobernig, Leonding (AT); Alexander Fleischanderl, Gruenau (AT); Christof Lanzerstorfer, Wels (AT)

(73) Assignee: Voest - Alpine Industrieanlagenbau GmbH & Co., (AT)

( * ) Notice: Subject to any disclaimer, the term of this patent is extended or adjusted under 35 U.S.C. 154(b) by 130 days.

(21) Appl. No.: 10/311,105

(22) PCT Filed: May 21, 2001

(86) PCT No.: PCT/EP01/05791

§ 371 (c)(1),
(2), (4) Date: Apr. 25, 2003

(87) PCT Pub. No.: WO01/96249

PCT Pub. Date: Dec. 20, 2001

(65) Prior Publication Data

US 2003/0159309 A1 Aug. 28, 2003

(30) Foreign Application Priority Data

Jun. 14, 2000 (AT) ............................ A 1028/2000
Sep. 22, 2000 (AT) ............................ GM703/2000
Feb. 13, 2001 (AT) ............................ A 213/2001

(51) Int. Cl.
*F26B 3/34* (2006.01)

(52) U.S. Cl. ............................ 34/265; 34/389; 34/576

(58) Field of Classification Search .................. 34/265, 34/275, 389, 426, 467, 516, 576
See application file for complete search history.

(56) References Cited

U.S. PATENT DOCUMENTS 4,724,777 A * 2/1988 Reed et al. ................. 110/246
4,849,114 A * 7/1989 Zeff et al. .................... 210/747
4,935,114 A * 6/1990 Varma ................... 204/157.43
5,209,028 A * 5/1993 McDermott et al. .......... 451/89
5,393,417 A * 2/1995 Cox .......................... 210/96.1
5,427,693 A * 6/1995 Mausgrover et al. ....... 210/739
6,213,029 B1 * 4/2001 Potter et al. ................ 110/229
6,391,272 B1 * 5/2002 Schroeder ................ 423/245.3

FOREIGN PATENT DOCUMENTS

AT 400579 1/1996

(Continued)

*Primary Examiner*—Stephen Gravini
(74) *Attorney, Agent, or Firm*—Ostrolenk, Faber, Gerb & Soffen, LLP

(57) ABSTRACT

The invention relates to a process for treating a hydrocarbonaceous waste material, in particular a rolling scale slurry and/or grinding slurry, the waste material being heated in a dryer, preferably moving, by the indirect supply of heat, and in the process hydrocarbons, if appropriate together with other volatile components, in particular $H_2O$, being removed. In this process, in the dryer, at low temperature, the hydrocarbons are broken down in a specific way, the hydrocarbons being broken down by chemical and/or radiation means, which effect decomposition of the hydrocarbons of low volatility into highly volatile hydrocarbons, preferably decomposing high molecular weight hydrocarbons into lower molecular weight hydrocarbons, and the hydrocarbons, if appropriate together with the other volatile components in particular together with the $H_2O$, are at least partially discharged, in particular by suction, from the vessel. The invention also relates to a apparatus for treating a hydrocarbonaceous waste material.

39 Claims, 5 Drawing Sheets

FOREIGN PATENT DOCUMENTS

Figure 1:
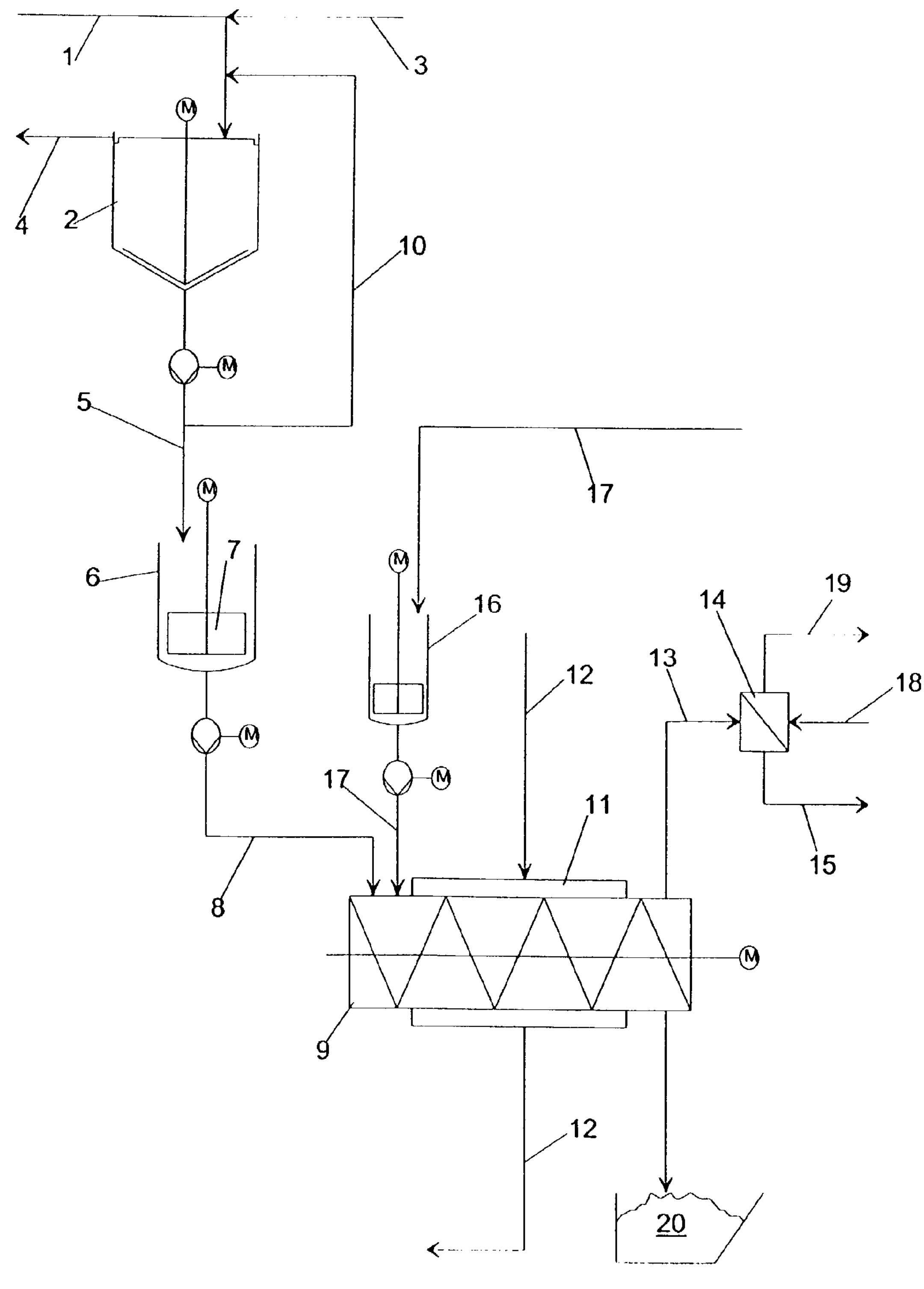

| | | |
|---|---|---|
| DE | 19715839 | 10/1998 |
| EP | 0126619 | 11/1984 |
| EP | 0184411 | 6/1986 |
| EP | 0224353 | 6/1987 |
| EP | 0373577 | 6/1990 |
| EP | 0446779 | 9/1991 |
| EP | 0891799 | 1/1999 |
| GB | 2033065 | 5/1980 |
| JP | 10-169957 | 6/1998 |
| WO | 99/58459 | 11/1999 |

* cited by examiner

DEVICE AND METHOD FOR TREATING A REFUSE MATERIAL CONTAINING HYDROCARBONS

The invention relates to an apparatus and a process for treating a hydrocarbonaceous waste material, in particular a rolling scale slurry and/or grinding slurry, the waste material being heated in a dryer, preferably moving, by the indirect supply of heat, and in the process hydrocarbons, if appropriate together with other volatile components, in particular $H_2O$, being removed.

Waste materials, in particular solids and slurries, which are contaminated with hydrocarbons (organic compounds) are produced on the one hand in numerous production processes, for example as grinding slurries or rolling scale, and on the other hand in the event of an undesired escape of hydrocarbons into the environment, such as for example as oil-contaminated earth.

Scale, in particular rolling scale, is produced during steel processing, in particular during slab deformation in a rolling mill. Furthermore, the scale is also formed during operation of continuous casting plants.

The scale is contaminated on account of operating media, in particular greases and oils, such as those which are preferably used as friction-reducing additives, which has hitherto made recycling particularly difficult or even altogether impossible.

Hydrocarbon-contaminated waste materials represent a considerable problem for the environment, since there is no efficient yet inexpensive process available for reprocessing these waste materials.

Various processes for treating hydrocarbon-contaminated waste materials are known in the prior art.

By way of example, various methods for supplying a rolling scale slurry, such as in particular a mixture of scale, oil, grease and water as mentioned, for recycling are known. In these methods, the rolling scale slurry which is produced during the waste water treatment of the metallurgical plant or rolling mill is made useable by special processes and apparatuses.

The disclosure EP0373577A1 describes a two-stage process and an apparatus for the treatment of clarification sludges or industrial slurries which have organic constituents. As part of the conversion process described, the sludges or slurries are subjected to preliminary mechanical dewatering, are conveyed into the interior of an indirectly heated continuous conveyor and there are subjected to heating with simultaneous expulsion of the highly volatile components. A subsequent second stage involves residence at the conversion temperature in order to expel the remainder of the volatile components from the solid product. In practice, this procedure has proven relatively inefficient, since to expel the hydrocarbons, the apparatus and procedure described requires the sludge or slurry to be heated to a relatively high temperature. It is therefore impossible for a plant of this type to operate economically.

The publication DE19715839 A1 describes a process and an apparatus for cleaning oil-containing and water-containing rolling scale slurries, in which the slurries are subjected to a two-stage treatment. In a first step, water is volatilized by heating the slurries. In a second step, the dried slurry is subjected to a vacuum treatment at elevated temperature, in order to volatilize the hydrocarbons. In practice, the installation has proven relatively inefficient, since in particular the generation of the vacuum required in order to volatilize the hydrocarbons entails high set-up and operating costs.

Furthermore, two-stage processes are generally characterized by a high outlay on apparatus and on control engineering.

The publication AT400579B describes a single-stage process for utilizing material which includes organic chemical contaminants, such as for example oil or grease, and maybe moist and contain metal, such as for example scale or chips, in which the material is heated in a reducing atmosphere by indirect heating to above the boiling temperature of the fraction of the organic contaminant which has the highest boiling point, and in the process is purged with "non-oxidizing carrier gas", in order to avoid condensation. In practice, this process has likewise proven uneconomic.

Therefore, the present invention is based on the object of overcoming the drawbacks from the prior art and of developing a simple and economic process in accordance with the preamble of Claim 1, as well as a suitable apparatus for carrying out the said process in accordance with the preamble of Claim 16.

According to the process of the invention, this object is achieved as described in the characterizing part of Claim 1, and according to the apparatus of the invention, the object is achieved as described in the characterizing part of Claim 16.

Breaking down the hydrocarbons by chemical and/or radiation means which effect decomposition of the hydrocarbons of low volatility into highly volatile hydrocarbons, in particular of high molecular weight hydrocarbons into lower molecular weight hydrocarbons, in particular by means of selective oxidation, allows hydrocarbons to be removed from the waste material effectively even at low temperatures.

Furthermore, the process according to the invention is distinguished by the fact that indirect heating of the waste material is used.

In the prior art, to achieve economic treatment times it is primarily direct heating which is used, whereas, particularly in large-scale plants, indirect heating, for example through the vessel wall of a dryer, is ruled out for economic reasons in that, during indirect heating, unlike with direct heating by means of a flame and hot gas, the heating takes place only through thermal conduction. It is correspondingly a slow process to reach the operating temperature in the dryer.

However, since indirect heating, in particular in view of environmental considerations is particularly advantageous, the process temperature in the dryer is accordingly kept at a low level, as proposed by a preferred embodiment of the process according to the invention. In this way, the time required for heating, in particular when starting up the cold dryer, can be minimized.

The use of chemical and/or radiation means for decomposing the hydrocarbons reduces the mean volatilization temperature of the hydrocarbons and thus significantly accelerates the cleaning operation, in particular at the low treatment temperatures prevailing.

The increased economic viability of the process compared to the prior art results on the one hand from a lower consumption of heating energy and on the other hand, on account of the shorter treatment time and the lower maximum operating temperature, from smaller, less expensive process apparatus.

The waste material is preferably heated while it is being moved, in order to ensure rapid and uniform heating.

According to a preferred embodiment of the process according to the invention, the movement of the solids and/or slurries in the vessel can be effected by movement of the vessel, for example by rotation of the vessel, and/or by movement of an apparatus in the vessel, for example by rotation of a tool.

According to various embodiments of the invention, it is possible for the process to be operated at atmospheric pressure, at excess pressure or at reduced pressure. When operating at excess pressure, by way of example a fan for extracting the exhaust gases from the dryer would be dispensed with. When operating the process at excess or reduced pressure, it would be advantageous for the material inlet and material outlet to be of gas tight design.

According to a particular embodiment of the invention, the hydrocarbons are broken down at temperatures below 450° C., in particular 400° C.

According to another embodiment of the process according to the invention, a maximum temperature, with respect to the heating medium, of 350° C., in particular 300° C., is established in the dryer.

According to further particular configurations of the process according to the invention, the dryer is operated at a pressure-dependent internal temperature, based on the waste material, of from 40° C. to 350° C., 300° C., 450° C. or preferably up to 400° C., in particular in the range from 80° C. to 250° C., particularly preferably in a range from 120° C. to 200° C. (values for 1 atm) or corresponding temperatures for other pressure conditions.

However, it is quite possible, depending on the composition of the waste material to be treated, to carry out a treatment at pressure-dependent temperatures, based on the charge material, of up to 500° C., in particular from 130–250° C., particularly preferably at temperatures of 140–180° C. (at a pressure of 1 atm).

At the same time, it is impossible to rule out the possibility that the charge material will briefly, in particular locally, be heated to above the process temperature.

According to a particular embodiment of the invention, the heat is supplied indirectly via the vessel wall and/or via heated moveable parts and/or by means of radiation, such as for example via microwaves.

Since, according to one embodiment of the process according to the invention, no heating gas is introduced into the drying vessel, in particular into the treatment chamber of the drying vessel, and the volume of the gases to be extracted is very small, the outlay for the necessary treatment of the extracted gas is minimized.

The independent regulation of the heating capacity and of the composition of the gas atmosphere in the dryer which according to a further embodiment is possible by means of the indirect heating is also advantageous.

According to another particular embodiment of the process according to the invention, oxygen, in particular an oxygen/inert gas mixture or oxygen-enriched air, and/or solid and/or liquid and/or gaseous peroxide/hyperoxide, preferably hydrogen peroxide, and/or ozone and/or a catalyst is used as chemical means for decomposition of the hydrocarbons, for example by means of selective oxidation.

However, it is also possible for other, in particular oxygen-containing gas mixtures or substances to be used.

According to various embodiments of the invention, oxygen is provided and/or supplied in a targeted way, for example, as technical-grade oxygen or as a constituent of a gas mixture, in particular in the form of air. In addition, it is conceivable for the oxygen to be provided by adsorbing and/or absorbing solids, in liquid form or in the form of an oxygen-releasing chemical compound. The supply of the oxygen carrier, in particular of the technical-grade oxygen, for carrying out the treatment of the waste material into the dryer is preferably a regulated supply.

According to a further embodiment of the invention, peroxides/hyperoxides in gaseous and/or liquid and/or solid form, preferably hydrogen peroxide, and/or ozone is/are used, exclusively or in addition, as the chemical means.

According to one preferred embodiment of the process according to the invention, the volatilization of the moisture contained in the waste materials assists the volatilization of the (steam-volatile) hydrocarbons. In particular the addition of oxygen-containing oxidizing agents causes oxygen-containing groups to form in the hydrocarbon molecules, with the result that the hydrophobic properties of the hydrocarbons are reduced. This has an advantageous effect on the steam volatility of the hydrocarbons, so that it is possible to further accelerate the volatilization of the hydrocarbons.

According to a further particular embodiment of the process according to the invention, the use of catalysts leads to acceleration of the breakdown reactions of the hydrocarbons. The catalyst can, depending on its composition, be introduced as fine material and may preferably then remain in the material from which oil has been removed, or may be introduced into the vessel in the form of relatively large pieces, in which case the pieces are then separated from the material from which oil has been removed and are reused. Before being reused, it is also possible, depending on the type of catalyst, to treat the catalyst in order to increase its activity.

According to a further embodiment of the process according to the invention, the decomposition of the hydrocarbons generates additional heat, for example through exothermic oxidation, which becomes active directly at the waste material, thus heating the waste material from the inside out. In this way, the heating and internal heating of the charge material can be improved and the process can be accelerated.

The addition of an oxidizing agent leads, for example, to an, in particular oxidative, at least partial breakdown of the hydrocarbons, which in turn leads to a fall in the volatilization temperature and therefore to more rapid volatilization of the hydrocarbons.

The fact that, according to an additional feature of the invention, the heating of the waste material, in particular of the solid and/or slurry, in order to expel the remaining volatile components, takes place at least partially in an atmosphere with an oxygen level, preferably based on dry air, of greater than 20.8% by volume oxygen, preferably with an oxygen level, preferably based on dry air, of 25 to 50% by volume of oxygen, means that a large proportion of the hydrocarbons contained are removed from the waste material considerably more quickly compared to the prior art. The oxygen acts in a specific way on the hydrocarbons contained in the waste material, and in this way leads to a reduction in the reaction temperature and to more rapid vaporization of the hydrocarbons.

According to further preferred embodiments of the invention, the treatment is carried out in atmosphere with an oxygen level, preferably based on dry air, of greater than 22 or 27% by volume of oxygen. With a suitable operating procedure, the proposed process has proven particularly economical.

If the waste material also contains readily oxidizable substances, such as for example metallic magnesium, it may be necessary, depending on the grain size, to set an oxygen content of below 20.8%, in order to restrict the oxidation kinetics. In this case, radiation is advantageously used to assist with breaking down the hydrocarbons.

According to a particularly preferred embodiment of the process according to the invention, high-energy radiation, in particular in the form of UV radiation, is introduced into the dryer as a radiation means for decomposing the hydrocarbons. In this way, it is possible to accelerate the breakdown reaction of the hydrocarbons.

According to a particularly preferred embodiment of the process according to the invention, the decomposition of the hydrocarbons, for example the cleaving of the chemical bond by means of high-energy radiation, generates additional heat, which acts directly on the waste material and in this way heats the waste material from the inside out. In this way, it is possible to improve the heating and internal warming of the charge material and to accelerate the treatment process.

According to an additional feature of the process according to the invention, the waste material, prior to the treatment, is mechanically dewatered and/or chemically and/or thermally pre-dried.

The dewatering or preliminary drying alone removes a large proportion of the water from the waste materials, in particular the rolling scale slurries, with the result that the throughput or treatment times for removal of the hydrocarbons are reduced considerably.

According to a further embodiment of the invention, at least a part of the $H_2O$ content of the waste material can be released by the addition of unslaked lime, the quantity of unslaked lime added preferably corresponding to or being lower than the stochiometric ratio of the lime slaking reaction.

The reaction of the unslaked lime results in the formation of heat, thus accelerating the heating of the waste material significantly. Furthermore, the addition of the lime has proven particularly advantageous for the further processing of the waste material, for example in a sintering plant or in an agglomeration process. Particularly during the agglomeration (for example granulation, briquetting), it is in this way possible to at least partially eliminate the use of an additional binder. Experience has shown that agglomeration without additional binders is possible if more than 5% by weight of CaO is added. Finally, as is already known to the person skilled in the art from the prior art, it is possible to harden the agglomerates using $CO_2$(formation of limestone).

According to various embodiments of the invention, it is possible to operate the pre-drying and/or the treatment both at standard pressure (1 atm) and at excess pressure or reduced pressure.

According to a particular embodiment of the invention, the dryer is heated, in particular indirectly, during the preliminary thermal drying, and this is followed, at a pressure-dependent internal temperature, based on the solid and/or slurry, of, for example, from 40 to 200° C., in particular 90 to 110° C., particularly preferably at about 105° C. (1 atm), by vaporization of the highly volatile components, in particular the water, contained in the solid and/or slurry. When the highly volatile components have been vaporized, further heating is brought about, for example during the subsequent treatment of the waste material, so that volatile hydrocarbons leave the solid and/or slurry and are vaporized. During the treatment according to the invention, a means for decomposing the hydrocarbons leads to a significant acceleration of the cleaning process. In the process, by way of example, oxygen, which significantly accelerates this operation in particular at over 140° C., effects at least partial exothermic oxidation and/or cleaving of the hydrocarbons, for example to form carbon monoxide and/or carbon dioxide, and if appropriate an exothermic, partial oxidation of the solid and/or slurry, for example of the iron oxide of a rolling scale slurry from wustite to form haematite and/or magnetite. This oxidation leads to acceleration of the heating and, if appropriate, of the cracking processes, with the result that more short-chain hydrocarbons are formed. At least some of the oxygen of the atmosphere in the drying vessel is consumed during the abovementioned reactions.

Unlike in the prior art, the exhaust gas from the present process according to the invention contains a large proportion of short-chain hydrocarbons, which significantly simplifies the further treatment of the exhaust gas. For this reason, it is appropriate to adapt the exhaust-gas treatment which is known from the prior art.

Compared to the prior art, it is possible to effect a shortened treatment time of the waste material, a lower process temperature and a more economic operation of an apparatus of this type and of a process of this type.

According to a further feature of the invention, the slurries are mechanically dried, in particular dewatered, prior to the preliminary thermal drying and/or the further treatment of the waste materials.

According to a further additional feature of the process according to the invention, the temperature of the waste material and/or the composition of the exhaust gases, in particular the extracted exhaust gases, is measured in the dryer. According to a further feature of the process according to the invention, the process parameters of the treatment in the dryer, for example the movement intensity in the dryer and/or the heating capacity in the dryer and/or the temperature of the waste material in the dryer and/or the quantitative use of the chemical and/or radiation means for breaking down the hydrocarbons, are controlled and/or regulated, preferably on the basis of the measured variables determined.

According to one embodiment of the process according to the invention, the oxygen concentration and/or the oxygen quantity in the treatment chamber is controlled or regulated in a targeted manner. In this way, it is advantageously possible to take into account the nature and composition of the charge material. Depending on the nature and composition of the waste material, and, for example, depending on the progress of the reaction, it is possible to establish a predetermined oxygen concentration and/or oxygen quantity in the atmosphere of the treatment chamber. In this way, the process according to the invention can be operated particularly economically.

According to a further feature of the invention, the temperature of the solid and/or the slurry is regulated in a targeted manner during the treatment. The regulation takes place, for example, with a view to the oxygen supply of the atmosphere in the dryer and/or the irradiation intensity of the waste material, and/or to the composition of the solid and/or slurry which is to be treated, and/or to the progress of the reaction of expulsion of the hydrocarbons.

To control the process efficiently, it is advantageous to measure the temperature in the vessel, preferably the temperature of the waste material, and/or the temperature and/or the composition of the extracted gases (one or more of: carbon monoxide content, carbon dioxide content, hydrogen content, oxygen content, hydrocarbon content). The measured variables determined assist, for example, with controlling and/or regulating the process parameters, in particular the supply of heating energy and/or the supply of oxidizing agent and/or the movement intensity, which can be changed appropriately during the process.

By evaluating the measured variables, it is possible to draw conclusions as to the progress of the reaction in the process. In this way, it is possible to produce a product which has an in particular constant composition and satisfies the high quality standards of the iron and steel industry. Particularly when utilizing the end product of the process according to the invention in a sintering plant, and/or a blast furnace, the end product may only have a limited content of hydrocarbons. Strict stipulations, relating to the maximum level of hydrocarbons also have to observed when recycling contaminated earth.

According to a particular embodiment of the process according to the invention, a control variable is determined by, for example, comparing the hydrocarbon content of the waste material before and after the treatment in the drying vessel and/or analysing the composition of the exhaust gases from the dryer, and the quantitative use of the chemical and/or radiation means for breaking down the hydrocarbons is regulated, for example, taking into account the temperature and/or the movement intensity of the charge material in the dryer.

According to a particular embodiment of the subject matter of the invention, the hydrogen content in the dryer or in a line at the dryer is measured. In this way, it is possible to ensure a high level of operational reliability. By way of example, if a hazardous concentration of $H_2$ is detected, the $O_2$ supply to the dryer is stopped or restricted, and the dryer is purged, if appropriate, with inert gas, in particular $N_2$.

The temperature at the dryer is preferably measured using thermocouples which, for example, in a protective tubular jacket, are guided into the working region of the dryer.

Taking into account further regulating and control variables, such as for example the setting of the treatment time of the waste material in the dryer, preferably as a function of the product temperature reached, as has proven favourable in particular in the case of a quasi-continuous configuration of the process, forms the subject matter of further preferred embodiments of the invention.

According to a particular embodiment of the process according to the invention, the discharged, in particular extracted, gases are passed for dedusting, preferably via heated lines, into a preferably thermally insulated and/or indirectly heated dedusting device, in particular a hot gas cyclone.

Various exhaust cleaning processes are available for the person skilled in the art to chose for the treatment of the discharged gases, depending on the nature of the hydrocarbons. However, it is advantageous for the extracted gases to be passed into a, preferably thermally insulated and/or indirectly heated, dedusting device, in order to separate out dust particles which have been entrained from the treatment vessel.

The dedusting device is preferably operated at a temperature which at least corresponds to the temperature in the dryer. This prevents deposition of the volatile components, in particular of the, preferably relatively high-boiling, hydrocarbons, on cold surfaces.

According to a preferred embodiment of the invention, the temperature of the dedusting device is set at least as high as the process temperature for expulsion of the volatile components, in particular of the hydrocarbons, in the dryer and/or during the preliminary drying of the waste material.

According to a further embodiment of the process according to the invention, the exhaust gases, which have preferably been pre-dedusted, from the treatment and/or preliminary drying of the waste material are cooled, in particular expanded, in a cooler, preferably a condenser, and/or are partially freed of contaminants and, if appropriate, are then filtered in an activated carbon filter and/or biofilter.

According to a further embodiment of the process according to the invention, the exhaust gases, which have preferably been pre-dedusted, are subjected to thermal and/or catalytic combustion and in this way any residues, in particular residual hydrocarbons, such as those which, for example, cannot be separated out in a condenser, are removed.

The, in particular complete, breakdown of the hydrocarbons of the exhaust gas preferably takes place by catalytic and/or thermal combustion in a corresponding device. The energy from this combustion is advantageously used, for example to heat the heating medium which is required for heating of the drying vessel.

According to a particular embodiment of the process according to the invention, the energy from the thermal and/or catalytic combustion is used to heat the dryer, for example to heat a heat-transfer oil, and/or further apparatus for carrying out the process.

According to a further additional feature, the exhaust gas, which has preferably been pre-dedusted, is burnt in a combustion device, for example in a pusher type furnace for heating slabs. In this way, if appropriate it is possible to dispense with the fitting of a condenser or with the condensation of the hydrocarbons.

According to a further embodiment of the invention, the dedusting of the exhaust gas may take place before or after the thermal or catalytic combustion.

According to a further embodiment of the invention, a number of lines, in particular pipes, which serve to collect and convey the exhaust gas from the preliminary drying and/or the treatment, for example into the dedusting apparatus and/or, if appropriate from the dedusting apparatus into the condenser, are heated, preferably indirectly, in addition to the heating by the exhaust gases themselves. This prevents precipitation of volatile substances, in particular relatively high-boiling hydrocarbons. The temperature set is in this case preferably at least as high as the process temperature of the process step in question.

The invention has proven particularly advantageous for the treatment of scale-containing slurries, in particular rolling scale slurries and grinding slurries, and is described in most detail in this connection. However, the statements made in connection with this specific medium are of only exemplary nature and in no way restrict the use of the subject matter of the invention to the treatment of slurries in general or rolling scale slurries in particular.

The process according to the invention and the apparatus according to the invention can also be employed for the treatment of other hydrocarbonaceous waste materials, in particular those which have solid particles, preferably from the metal-processing industry, such as those which are formed, for example, during the production or treatment of iron, aluminium, titanium, copper and/or other metallic materials. Furthermore, the process according to the invention can also be used to treat hydrocarbonaceous solids and/or slurries, for example from the non-metal-processing industry, in particular grinding slurries.

The proposed process is particularly advantageous, for example, for the treatment of substances which contain hydrocarbons and metals, in particulars of slurries.

The process according to the invention and the apparatus according to the invention is also suitable for cleaning oil-contaminated soils, for example for producing building materials.

The inventive separation of the hydrocarbons from the waste material, for example from the rolling scale slurry, allows the end product of the process to be used in sintering plants or other devices for which a low hydrocarbon content is required.

If appropriate, when using an oxidizing agent as chemical means for decomposing the hydrocarbons, the metallic components contained in the waste material are partially oxidized, the temperature in the interior of the dryer, on account of the exothermic oxidation which takes place to a limited extent, rising rapidly and without additional heating, so that considerable heating costs and treatment time are saved. Not least, it is also possible, as has already been mentioned, for the oxidation of the hydrocarbons to contribute to the further heating of the rolling scale slurry.

According to a preferred embodiment, when using an oxidizing agent as chemical means for decomposition of the hydrocarbons, the reaction of the hydrocarbons has substantially finished beyond a temperature which is dependent on the particular charge material—in the case of rolling scale slurries this temperature is approximately 180–200° C. (1 atm)—whereupon the sequence of exothermic reactions, for example the oxidation from wustite to haematite and/or to magnetite, allows a considerable temperature rise to take place.

If the waste material contains, for example, further substances which react exothermically with the oxidizing agent, preferably wustite or other metallic components, as well as the hydrocarbons, it has proven advantageous, in particular for limiting the temperature of the charge material in a targeted manner, to provide a controllable supply of inert gases, preferably over and above the regulation of the supply of oxidizing agent. A procedure of this nature allows regulation of the temperature and oxidation of the waste material in the treatment chamber to be significantly accelerated. Therefore, according to a preferred embodiment of the process according to the invention, a controllable supply of inert-gas carriers into the drying vessel is provided.

Therefore, the supply of oxygen can be limited by feeding inert-gas carriers, such as for example nitrogen, into the dryer, and in this way the temperature can be set rapidly and reliably. According to a further variant it is possible, in order to prevent an, in particular excessive, heating of the waste material, to stop or restrict the supply of the agent for decomposing the hydrocarbons, in particular the oxygen.

The possible partial oxidation, for example of wustite to form haematite and/or to form magnetite, in the second process step of the process according to the invention is in principle not intended, since in particular when using the treated material in a reduction unit as used in the iron and steel industry, the partial oxidation which has taken place would in turn require additional reduction work. However, the partial oxidation of the wustite takes place in a strongly exothermic reaction, with the result that the temperature in the interior of the dryer rises rapidly and without additional heating, so that it is possible to save considerable heating costs.

When treating a rolling scale slurry, for example, the reaction of the liquid phases of the waste material in the dryer has substantially concluded beyond a temperature of 180–200° C., whereupon, as a result of the sequence of exothermic reactions, in particular the oxidation of wustite to haematite and/or to magnetite, a considerable temperature rise can take place.

As a result of the partial oxidation of the metal contained in the rolling scale slurry, in particular the iron, a cooling action is established when the end product is added to a metallurgical unit, for example an electric furnace. It is thus possible, on the one hand, to make advantageous use of the heat of the exothermic oxidation of iron in the rolling scale slurry treatment and, on the other hand, to make advantageous use of the cooling action of the treated and partially oxidized end product elsewhere.

According to an advantageous configuration of the invention, it is possible, by regulating the indirect heating, for example also in the sense of cooling of the heating medium (cooling medium), for the process, in particular the temperature of the waste material in the treatment chamber, to be controlled.

According to further embodiments of the invention, the dryer according to the invention also fulfils the function of a mixer and/or granulator.

The parameters of the process according to the invention, in particular for the treatment of the hydrocarbonaceous waste material, may in principle be selected independently of one another. However, it is expedient, for example, to adapt the process parameters of the, in particular thermal, preliminary drying and/or of the further treatment of the waste material, in particular to attune the process temperatures and/or residence times of the waste material during the preliminary drying and the subsequent treatment.

The process according to the invention is preferably operated continuously or as a batch process.

According to a further, additional feature of the invention, the preliminary drying and/or treatment of the waste material takes place substantially quasi-continuously.

Plants and processes of this type, to the extent that they are known to the person skilled in the art from the prior art, are characterized by a discontinuous or batch wise mode of operation. Compared to this mode of operation, a quasi-continuous or continuous process is distinguished by increased economic viability, it being possible, if appropriate, to effect at least partial recycling of the exhaust gases.

In a quasi-continuous mode of operation, a small proportion of the treated material, with respect to the entire material situated in the dryer, is removed from the dryer, while untreated material is being introduced into the dryer. Unlike with the continuous mode of operation, this exchange does not necessarily take place continuously and/or so that the operations overlap in terms of time. According to a preferred embodiment, the solid and/or slurry may be introduced into the dryer via an intermediate hopper with a suitable metering device.

Compared to a continuous mode of operation, the quasi-continuous operation is distinguished by its high process and operating reliability.

According to an additional feature of the invention, the exhaust gases, which preferably substantially comprise CO, $CO_2$, $O_2$ and gaseous-hydrocarbons, are extracted from the reaction space and are subjected to an exhaust-gas treatment, in particular to at least partial recycling.

According to a particularly preferred embodiment of the invention, the, in particular thermal, preliminary drying and the further treatment of the waste material are carried out in a single dryer, the fitting of a further dryer in this way being eliminated, thus eliminating considerable investment and operating costs. A dryer of this type is in this case preferably operated discontinuously, i.e. batchwise.

According to a further additional feature of the process according to the invention, the preliminary drying is carried out in a first dryer and the further treatment is carried out in a second dryer. This allows the process according to the invention to operate particularly reliably and safely.

In this case, batch operation or quasi-continuous operation of the treatment of the waste material and/or of the preliminary drying and/or of both process steps is preferably possible. Consideration may also be given to a continuous configuration of the process.

According to a further preferred embodiment of the invention, the slurries which are to be subjected to the thermal and/or chemical preliminary drying and/or to the mechanical drying are removed from the final stage of a multistage sedimentation and filtration process.

In the prior art, these slurries constitute a considerable disposal problem, since they have a particularly high hydrocarbon content. With the process according to the invention, it is even possible to recycle these slurries.

According to a further additional feature of the process according to the invention, the exhaust gas from the preliminary drying and/or the further treatment of the waste material is passed into a dedusting apparatus.

According to the process according to the invention, a metallurgical substance which has a hydrocarbon content of less than 0.2% by mass, preferably less than 0.1% by mass, and an iron oxide content of at least 80% by mass, preferably of at least 84% by mass, is produced from a hydrocarbonaceous, possibly oxide-containing, waste material, preferably a rolling scale slurry or a slurry from the water treatment of a continuous casting plant.

According to a further feature, this product is characterized by an iron content of substantially 60–80% by mass, in particular an iron content of 63–72% by mass, of which approximately 50–60% by mass is FeO and approximately 30–40% by mass is $Fe_2O_3$.

According to a further feature of the process according to the invention, at least partial circulation of the waste material in the preliminary drying and/or treatment stage is possible. In this way it is possible, for example, by detection of the hydrocarbon content to return partially treated and/or pre-dried material into the corresponding treatment stage.

The following non-restrictive process data from tests using $O_2$ as the chemical means for decomposition of the hydrocarbons of the waste material in particular as an oxidizing agent, vary according to the type of rolling scale and the rolling oils used.

Process operation: batch mode

Quantity of charge material: 1 t

Oil content of the rolling scale before and after the treatment:

Before the treatment: 1–5% by weight

After the treatment: <0.1–0.3% by weight

Water content of the rolling scale before and after the treatment:

Before the treatment: 10–40% by weight

After the treatment: <0.1% by weight

Treatment temperature: start at RT; end at 250–350° C.

Treatment time: 30–60 min

Oxygen: 20–30% by volume

Vessel size: 1.5 $m^3$

Vessel type: indirectly heated double-shell mixer (heated by heat-transfer oil)

Movement intensity: 30–100 revolutions per minute

The invention is also characterized by an apparatus for carrying out the process according to the invention, as claimed in Claim 16.

According to various embodiments of the invention, the dryer is designed, for example, as a heated rotary tube or a worm conveyor or as a heated mixer.

According to further embodiments of the invention, the dryer according to the invention also fulfils the function of a mixer and/or granulator, for example in the form of a mixer with a horizontal or vertical shaft. In another embodiment, the vessel is designed as a rotary tube or as mixer worm.

According to an additional feature of the apparatus according to the invention, a conveyor means for feeding oxygen and/or peroxide/hyperoxide and/or ozone into the treatment chamber of the dryer is provided as device for decomposing the hydrocarbons.

According to a further preferred embodiment, a radiation source for irradiating the waste material in the treatment chamber of the dryer, in particular with UV radiation, is provided as the device for decomposing the hydrocarbons.

According to a particular embodiment of the apparatus according to the invention, it is possible to combine a plurality of devices, for example chemical and/or radiation means, for decomposing hydrocarbons.

According to a further preferred embodiment, a line for supplying an inert-gas carrier, in particular an inert gas, particularly preferably a nitrogen carrier, is provided at the dryer.

According to a further preferred embodiment, a device for moving the waste material is provided in the dryer and/or the treatment space and/or the dryer itself is/are of rotatable design.

It has been found that indirect heating has various benefits compared to direct heating of the waste material, for example on account of environmental considerations. For example, in the case of indirect heating the waste heat from a metallurgical plant can be utilized in a particularly advantageous way. According to a particularly preferred embodiment of the invention, the heat from the exhaust-gas treatment, in particular the exhaust gas of the proposed process, is utilized, for example by means of combustion of the exhaust gas.

According to one feature of the apparatus according to the invention, the conveyor means for supplying oxygen comprises a means for supplying an oxygen carrier, in particular a line for supplying a gaseous and/or liquid oxygen carrier.

According to a further feature of the apparatus according to the invention, the means for supplying an oxygen carrier comprises a conveyor means, for example a conveyor worm, for conveying a solid oxygen carrier.

According to a further preferred embodiment, a dedusting device, which is, for example, thermally insulated and/or heatable, preferably indirectly, is provided for the purpose of dedusting the gases extracted from the treatment chamber, this device if appropriate being connected, if appropriate via a number of thermally insulated and/or additionally heatable lines, to the dryer on the one hand and if appropriate to further devices for treating the gases discharged from the dryer, on the other hand. The dedusting apparatus serves substantially to remove coarse particles and dusts from the hot exhaust gas.

The dedusting device may be designed, for example, as a cyclone, in particular as a hot gas cyclone, as filter, or as a scrubber. Consideration may also be given to dedusting means of a electrostatic filter, as is known to the person skilled in the art from the prior art. According to a preferred embodiment of the apparatus according to the invention, the dedusting apparatus may be indirectly connected to the dryer and may preferably be heatable together with the dryer.

According to a further preferred embodiment, downstream of the dryer, if appropriate downstream of the dedusting device, there is a cooler, preferably a condenser, and if appropriate then an activated carbon filter and/or biofilter for cleaning the discharged gases.

A cooler, as is known from the prior art, expands the exhaust gas and/or cools it and/or separates out relatively high-boiling constituents of the gas, in particular hydrocarbons. For further cleaning of the exhaust gases, an activated carbon filter or a combustion chamber may be arranged downstream of the cooler.

According to one feature of the invention, a number of thermally insulated and/or, in particular indirectly, heatable lines, in particular pipes, which serve to collect and convey the exhaust gas out of the dryer into further apparatus or exhaust-gas treatment, in particular into a dedusting apparatus and/or if appropriate out of the dedusting apparatus into a cooler, are provided.

According to a particular embodiment of the apparatus according to the invention, the lines are heated, in order to prevent them from becoming blocked by hydrocarbons or other vaporized substances which have a particularly high vaporization temperature and are therefore preferentially deposited on cold surfaces.

According to a further preferred embodiment, a thermal and/or catalytic combustion device for treatment of the discharged gases is provided downstream of the dryer, if appropriate downstream of the dedusting apparatus.

According to a further preferred embodiment, the combustion device for the thermal and/or catalytic conversion of the hydrocarbonaceous exhaust gas is coupled to the heating device of the vessel, so that the energy which is liberated in particular during the afterburning can be utilized.

According to a particular embodiment of the apparatus according to the invention, a flame arrester device, in particular in the form of a dip quench, is provided downstream of the dryer, if appropriate downstream of the dedusting apparatus.

According to a further feature of the invention, at least one activated carbon filter and/or a combustion chamber is arranged downstream of the dryer, if appropriate downstream of the dedusting device particularly preferably downstream of the cooler. Residues which occur, in particular hydrocarbons, are removed from the exhaust gas by the activated carbon filter.

According to another embodiment of the invention, the exhaust gas, if appropriate after suitable pretreatment, is catalytically and/or thermally burnt in the combustion chamber. In a downstream dedusting plant, residues can be cleaned out of the exhaust gas from the combustion chamber.

According to an additional feature of the invention, one or more lines for at least partially returning the exhaust gas from the preliminary drying and/or the further treatment of the waste material and/or from the cooler and/or from the dedusting device and/or from the activated carbon filter and/or from a further device of the exhaust-gas treatment into at least one of the dryers are provided. In this way, the exhaust gas which is produced can be recycled.

According to a further feature of the invention, two coolers are arranged downstream of the dryer, if appropriate downstream of the dedusting apparatus, a first cooler, in particular a first condenser, being provided for the purpose of condensing highly volatile components, in particular steam, and a second cooler, in particular a second condenser, being provided for the purpose of condensing components of low volatility, in particular hydrocarbons. In this case, for example when using a single dryer to carry out both the thermal preliminary drying and the further treatment of the waste material, a fitted control device can be used to introduce the exhaust gas, during the first process step, into a first condenser for separating out the water, and during the further treatment into a second condenser for separating out the hydrocarbons. In this case, the supply of gas which is to be condensed into the condenser in question is regulated by means of the control device.

According to a further feature of the apparatus according to the invention, a number of probes and/or sensors, which can be used to determine the oxygen supply in the dryer and/or the composition of the exhaust gas and/or of the atmosphere in the dryer (in particular the carbon monoxide, carbon dioxide, hydrogen, oxygen and/or hydrocarbon contents), and/or the temperature of the exhaust gas and/or the temperature in the dryer, are arranged at the means for feeding an oxygen carrier into the dryer and/or at at least one exhaust-gas line and/or at the dryer itself. By definition, the term exhaust-gas line denotes all the lines for discharging the exhaust gases from the dryer.

According to a further particular embodiment of the apparatus according to the invention, freely movable bodies, in particular beater bars, which reduce any caking of waste materials in the treatment chamber and any agglomerate formation, are provided in the dryer.

According to a further embodiment, the device for the indirect heating of the dryer and/or the device for moving the waste material in the treatment chamber are designed so that they can be regulated.

According to a feature of the apparatus according to the invention, a control device is fitted at the device for introducing the means for decomposing the hydrocarbons, in particular at the means for supplying the chemical means for decomposing the hydrocarbons.

According to a preferred embodiment, the solid and/or slurry is introduced into the dryer via an intermediate hopper using a suitable metering device.

Figure 2:
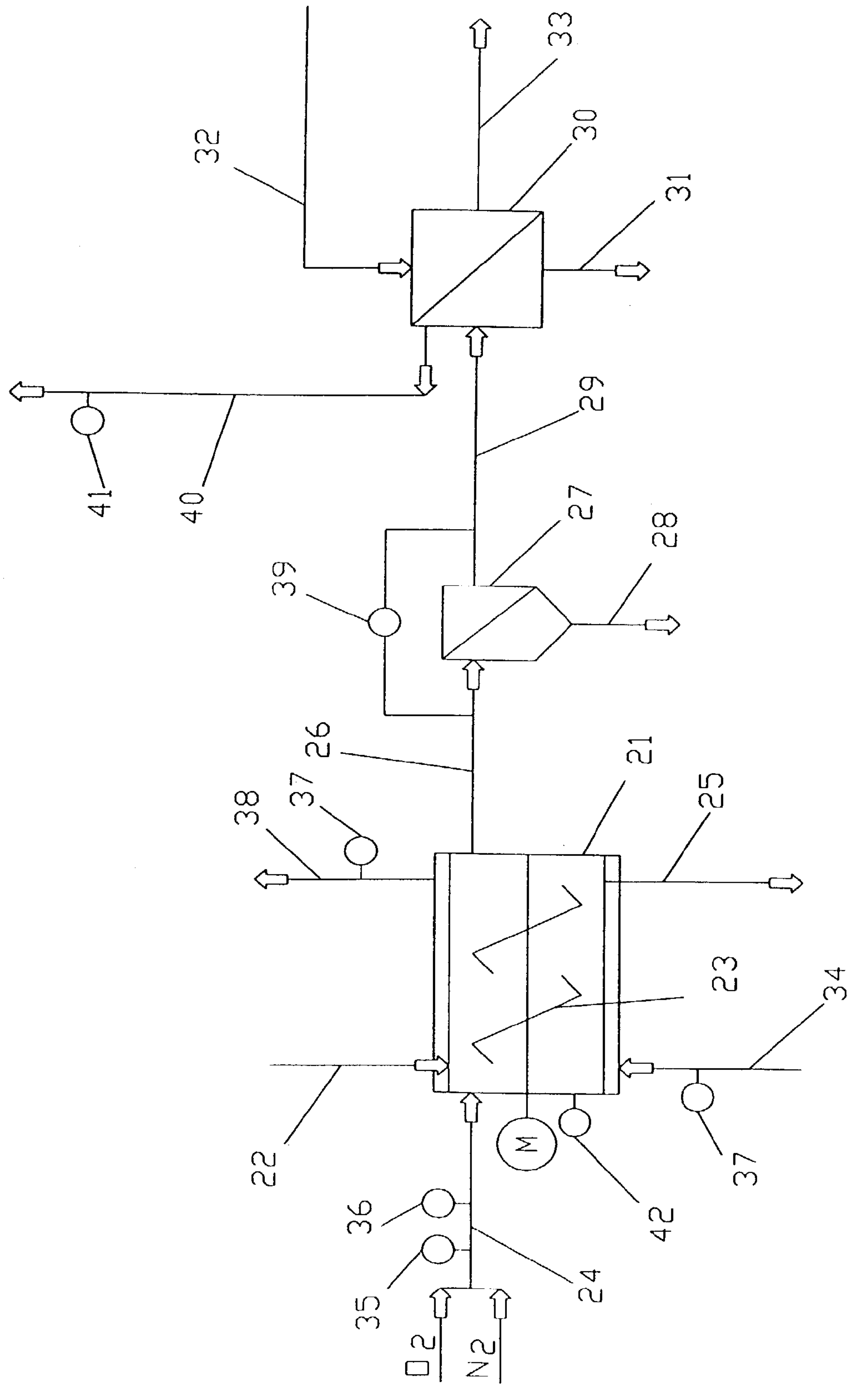
Figure 3:
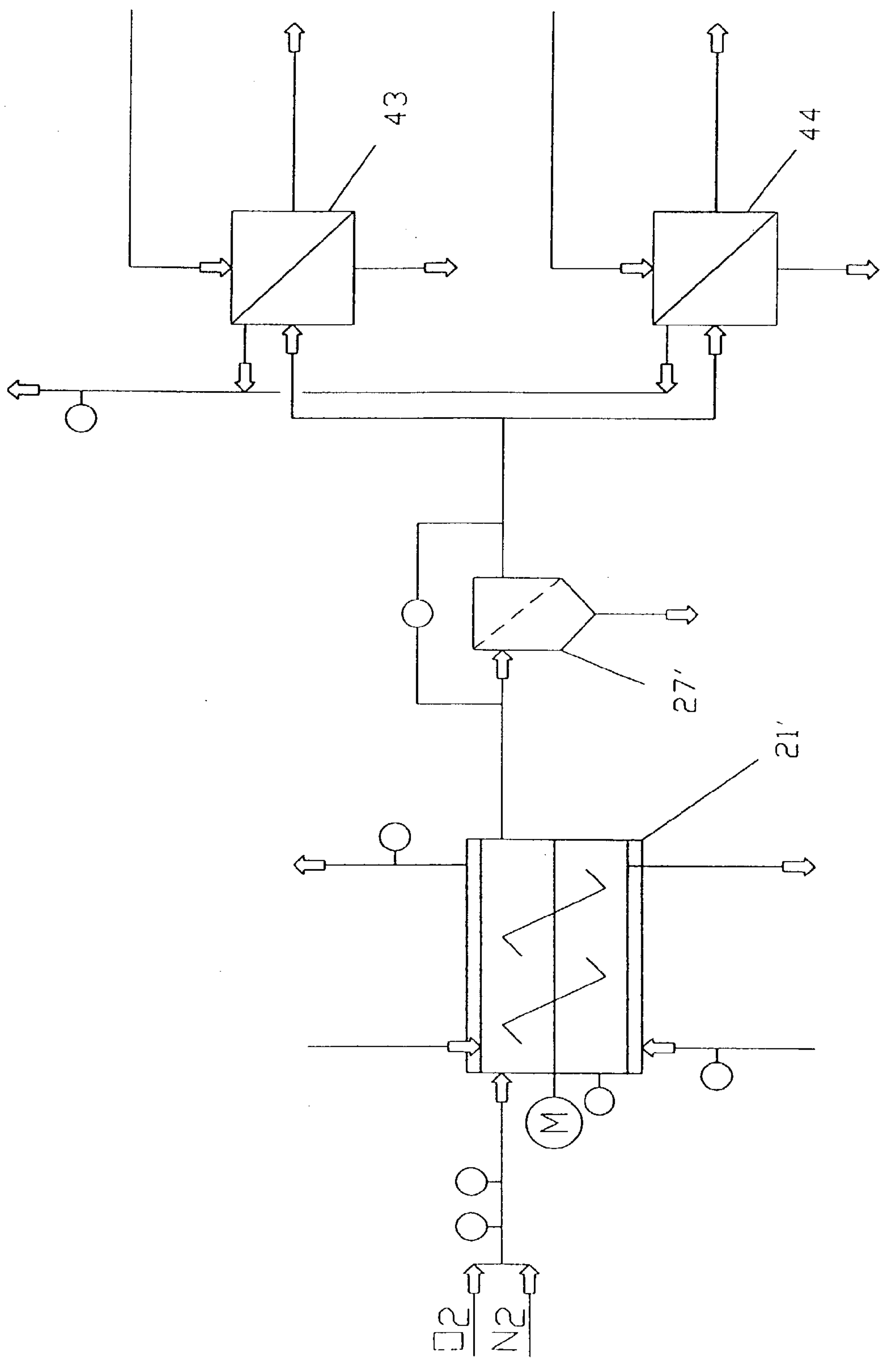
Figure 4:
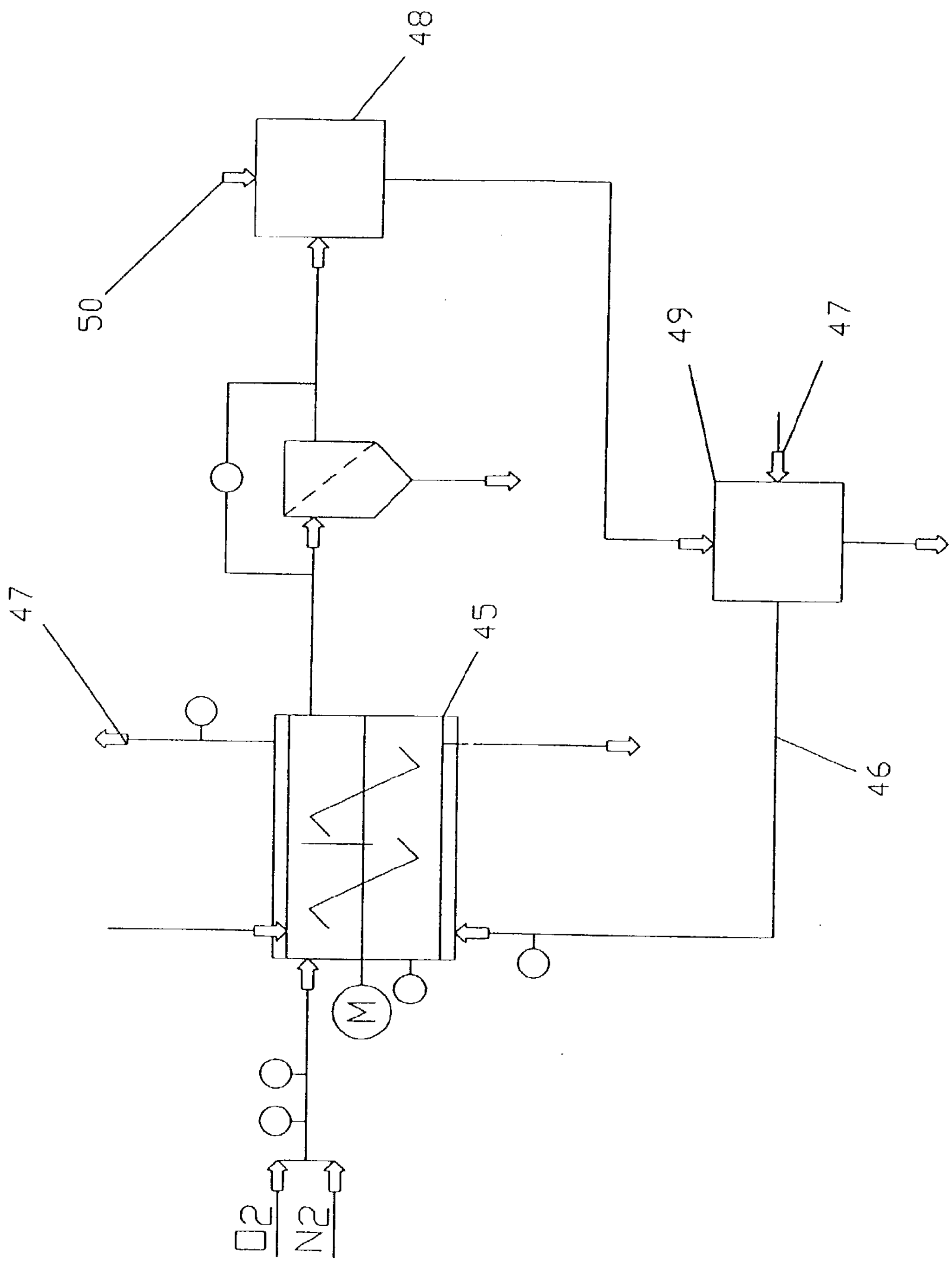
Figure 5:
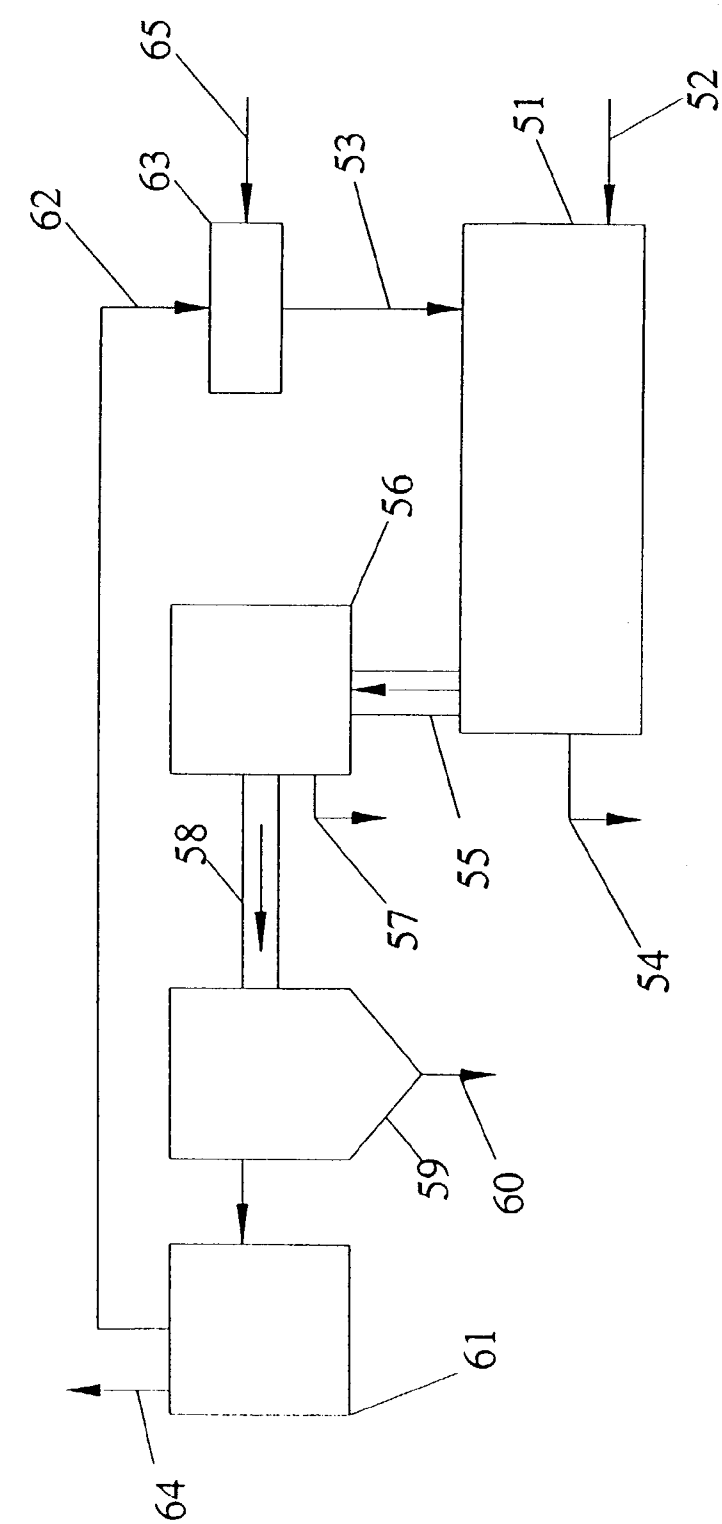

The process according to the invention, as well as the apparatus according to the invention, are explained in more detail diagrammatically on the basis of non-restricting drawings, in which:

FIG. 1 shows an apparatus for the preparation, in particular preliminary drying, of a waste material, FIG. 2 shows a non-restrictive diagrammatic embodiment of an apparatus for treating an optionally pre-dried waste material, FIG. 3 shows an apparatus for preliminary drying and further treatment of a waste material, FIG. 4 shows a non-restricting diagrammatic embodiment of an apparatus for carrying out the process according to the invention, FIG. 5 shows an apparatus for the treatment of a waste material with at least partial recycling of the process exhaust gas.

It can be seen from FIG. 1 that backwash waters 1 from a sand filter are fed to a thickener 2. If appropriate, a flocculating agent 3 is added to the backwash waters 1, in order to promote settling or precipitation of solids contained in the backwash waters 1. The sand filter, which is not shown in the drawing, represents the final stage of the multistage separation and/or filtration process.

Scale slurry with a high hydrocarbon content settles in the thickener 2. Overflow water 4 from the thickener 2 may be circulated and in this way reused, for example, as a rinsing medium for laden sand filters.

The thickener 2 is connected, via a slurry line 5, to a temporary slurry vessel 6, the temporary slurry vessel 6 being provided with an agitator device 7, in order to avoid further settling of the slurry and to make sure that it is still possible to pump the slurry.

The temporary slurry vessel 6 is connected, via a further slurry line 8, to a combined dryer/mixer/granulator 9. In a simple embodiment, the dryer/mixer/granulator 9 is designed as a variable speed plough share mixer or paddle mixer and, in the exemplary embodiment illustrated in FIG. 1, operates in batch mode.

Since scale slurry is fed continuously to the thickener 2, there are a number of arrangements for the transition from the continuously operated thickener 2 to the batch-operated dryer/mixer/granulator 9. It is possible—as shown in FIG. 1—to provide a temporary slurry vessel 6, but it is also possible—as is also illustrated in FIG. 1—for a return line 10, through which slurry is circulated via the thickener 2, to branch off from the slurry line 5. Finally, it is also possible for the thickener 2 to be dimensioned in such a manner that, under the given operating conditions, it is able to supply the dryer/mixer/granulator 9 with a batch of scale slurry at any time. Each of these three embodiments may be employed on its own or in combination with one or both of the others.

The dryer/mixer/granulator 9 is provided with a heating jacket 11 through which a heating medium 12 flows. The heating medium 12 may be in liquid or gaseous form, heat-transfer oil preferably being used as the liquid heating medium, although it is also possible to use superheated, pressurized water. The gaseous heating medium used may, for example, be one of the process gases or exhaust gases produced by a metallurgical plant, i.e. for example exhaust gas from an electrical furnace, a converter or a walking-beam furnace or top gas from the reduction shaft of a COREX plant. It is also possible to use saturated steam, hot steam or technical-grade nitrogen as gaseous heating medium.

The dryer/mixer/granulator 9 may be directly or indirectly heated, in which case, in the event of indirect heating, a heat transfer system is provided, by means of which heat is transferred from one of the process gases or exhaust gases to the heating medium 12, which in the case of indirect heating is preferably heat-transfer oil, hot steam, saturated steam or nitrogen.

The steam 13 emerging from the dryer/mixer/granulator 9 is condensed in a condenser 14 (with cooling water lines 18 and 19) and can be used as top-up water 15 for the closed circuits of a water treatment plant. The use of a dedusting device for dedusting the exhaust gas from the dryer may be necessary upstream of the condenser.

According to one possible embodiment, the dryer/mixer/granulator 9 is connected to a container 16 or binder 17, binder 17 being added to the dryer/mixer/granulator 9 after the drying of a batch of scale slurry has been completed. It is also possible to tolerate a small moisture content of the binder, since this moisture is also still removed. The dryer/mixer/granulator 9 is then switched into the "granulation " operating mode by increasing the rotational speed.

According to a further variant, granulation may be carried out after the oil removal, in accordance with the second process step of the process according to the invention, has taken place.

If no binder is added, the pre-dried product 20 is ultimately present in powder form with a grain size of approximately 1 to 1000 $\mu$m, or if binder is added and granulation takes place the pre-dried product is in the form of granules with a grain size of approximately 1 to 10 mm.

The plant as shown in the exemplary embodiment from FIG. 1 is able to process scale slurry from a hot-rolling mill with an annual capacity of approximately three million tonnes of broad strip.

In a hot-rolling mill of this type, by way of example approximately 420 kg/h of scale and approximately 12 kg/h of hydrocarbons are deposited in the sand filters, which constitute the final stage of the multistage sedimentation and/or filtration process. The sand filters are backwashed with water and this backwash water, which is laden with scale and hydrocarbons, is fed to a thickener 2. In the thickener 2, the hydrocarbonaceous scale slurry is dewatered until it has a dry matter content of approximately 35%. This dewatered scale slurry is transferred in batches into the combined dryer/mixer/granulator 9, where it is dried to a residual moisture content of <3% at, for example, 100° C. The dryer/mixer/granulator 9 is heated with saturated steam (5 bar, 1000 kg/h). The steam 13 which has evaporated out of the scale slurry is condensed in a condenser 14 (cooling water consumption approximately 16 $m^3$/h, 25° C.), and the condensate (approximately 800 kg/h, 40° C.) is used as top-up water 15 in a water treatment plant.

The finished product 20 can then be processed further in a suitable way (cf. FIG. 2).

FIG. 2 shows an apparatus for carrying out the process according to the invention, a vessel 21 being fed, via a conveyor line 22, with, preferably pre-dried (FIG. 1), rolling scale slurry. According to this embodiment, the rolling scale slurry has a low water content and a high hydrocarbon content. However, preliminary drying of this type is in no way imperative. The vessel 21 is equipped with an apparatus 23 for moving the rolling scale slurry which has been introduced into the vessel for treatment.

A chemical means for breaking down the hydrocarbons, in particular oxygen, is fed to the vessel 21 via a number of lines 24. In addition to the chemical means, inert gases, preferably nitrogen, may be introduced into the dryer. FIG. 2 shows a quasi-continuous process, in which the rolling scale slurry is conveyed through the vessel and is ultimately removed through a line 25 for further use. The exhaust gases which are produced in the vessel are introduced, via a heated line 26, into a thermally insulated and heated gas-dedusting apparatus 27, the gas being separated from dust which is discharged via a line 28. The gas is conveyed onward, via a heated line 29, into a condenser 30, is expanded and cooled in this condenser, and the condensed liquid is discharged via an outlet 31. In this case, a number of cooling lines 32, 33 are provided for cooling the condenser.

Finally, the gas passes, for example, into an activated carbon filter, where further contaminants, for example residual hydrocarbons, are removed.

The vessel in FIG. 2 is preferably indirectly heated, in which case a heating medium 34 flows through the jacket of the vessel. A number of valves and sensors or probes, by means of which the quantitative flow, the composition or other measured variables are recorded or controlled, are provided at the various lines for conveying the in particular gaseous media. In this case, sensors for recording the concentration 35, and flowmeters/valves 36 for controlling the quantitative flow are arranged at the line 24 for supplying the oxygen. In each case a sensor 37 for determining the temperature of the heating medium 34 is arranged at the line for supplying the heating medium and at the line 38 for discharging the heating medium. The pressure drop of the exhaust gas at the gas-dedusting apparatus is determined by means of a sensor 39. Finally, a probe 41 for determining the carbon monoxide, carbon dioxide and oxygen contents are provided downstream of the condenser, at a line 40 for discharging the residual gas.

The process temperature is recorded by means of temperature-measuring sensors 42 and represents a guideline value for process control.

FIG. 3 represents a further preferred, non-restricting embodiment of an apparatus for carrying out the process according to the invention, in which the preliminary drying and the further treatment of the waste material are carried out in a single dryer 21'.

The apparatus differs from the embodiment illustrated in FIG. 2 in that two condensers 43, 44 are provided downstream of the dedusting device 27'. In this case, one condenser 43, in a corresponding way to the condenser 14 shown in FIG. 1, is used for condensation of steam, and a second condenser 44, in the same way as the condenser 30 shown in FIG. 2, is used for the condensation of the hydrocarbons.

The apparatus illustrated is operated in batch mode, the path into the first condenser 43 being closed, and the path into the second condenser 44 being opened, downstream of the thermal preliminary drying (evaporation of the water) by means of a slide valve. The thermal preliminary drying is carried out at significantly lower temperatures than the subsequent treatment for removing the hydrocarbons contained in the waste material.

In terms of those parts of the plant shown in FIG. 3 which are not provided with a reference numeral, reference is made to FIG. 2 and to the description associated with FIG. 2, since these parts of the plant are equivalent to those shown in FIG. 2.

FIG. 4 represents a further preferred, non-restricting embodiment of an apparatus for carrying out the process according to the invention, the process operating in batch mode.

The apparatus differs from the embodiment illustrated in FIG. 2 in that the exhaust gas, after the dedusting or filtration, is thermally afterburned in an afterburning chamber 48 with a burner 50. The energy of the exhaust gas is used, by means of a heat exchanger 49, to heat the vessel 45 by means of the lines 47 and 46.

With regard to those parts of the plant which have not been provided with a reference numeral in FIG. 4, reference is made once again to FIG. 2 and to the description associated with FIG. 2, since these parts of the plant are equivalent to those shown in FIG. 2.

In FIG. 5, a dryer 51 is fed via a conveyor line 52 with rolling scale slurry, which has preferably undergone preliminary dewatering and/or preliminary drying. In this case, the rolling scale slurry is suitably pre-dried, if appropriate simply by thermal treatment (cf. FIG. 1) and has a low water content and a high hydrocarbon content.

The dryer 51 is supplied with oxygen via a number of lines 53. In addition to oxygen, further gases, preferably nitrogen, can be introduced into the dryer. FIG. 5 shows a quasi-continuous process, the rolling scale slurry being conveyed through a continuous dryer 51 and finally being removed through a line 54 in order to be used further. The exhaust gases formed in the dryer are introduced, via a heated line 55, into a thermally insulated and heated gas-dedusting apparatus 56, the gas being separated from dust, which is discharged via a line 57. The gas is conveyed onward, via a heated line 58, into a condenser 59, where it is expanded and cooled, and the condensed liquid is discharged via an outlet 60. In this case, a number of cooling lines for cooling the condenser are preferably provided.

Finally, the gas passes into an activated carbon filter 61 and further contaminants, for example residual hydrocarbons, are removed.

The cleaned gas is now suitable for reuse as process gas, and at least some of the gas is introduced into a gas-mixing device 63 via a line 62. Residual gas which is not suitable for reuse as process gas is discharged via a residual-gas line 64 and if appropriate is afterburned.

In the gas-mixing device 63, the recycled gas is if appropriate treated with fresh gas 65 before being introduced into the dryer 51 via the line 53.

What is claimed is:

1. A process for treating a hydrocarbonaceous waste material, comprising:

introducing the hydrocarbonaceous waste material into a dryer;

indirectly heating the hydrocarbonaceous waste material in the dryer removing volatile components including hydrocarbons;

while the hydrocarbonaceous waste material is in the dryer, at least one of chemically and radiologically decomposing the hydrocarbons of the hydrocarbonaceous waste material, such that lower volatility hydrocarbons of the hydrocarbonaceous waste material are decomposed into higher volatility hydrocarbons; and at least partially discharging the decomposed hydrocarbons and the volatile components from the dryer.

2. The method of claim 1, wherein the hydrocarbonaceous waste material is at least one of a rolling scale slurry and a grinding slurry.

3. The method of claim 1, wherein the partial discharging is by suction from the vessel.

4. The method of claim 1, wherein the hydrocarbonaceous waste material includes additional volatile components, the method further comprising heating the volatile components in the waste material for removing volatile components including hydrocarbons; and at least partially discharging the additional volatile components from the dryer after the hydrocarbons of the hydrocarbonaceous waste material are decomposed in the decomposing step.

5. The method of claim 1, wherein the partial discharging is by suction from the vessel.

6. The method of claim 1, wherein the hydrocarbons of the hydrocarbonaceous waste material are decomposed chemically using at least one chemical agent selected from the group consisting of oxygen, a mixture of oxygen with at least one inert gas, oxygen enriched air, peroxide, hyperoxide, ozone, and a catalyst.

7. The method of claim 6, wherein the peroxide includes at least one state of peroxide selected from the group consisting of solid peroxide, liquid peroxide, gaseous peroxide, hyperoxide and hydrogen peroxide.

8. The method of claim 6, further comprising setting an oxygen level greater than 20.8% by volume of air at least once during the treating process.

9. The method of claim 6, further comprising setting an oxygen level at about 20.8% by volume of air at least once during the treating process.

10. The method of claim 1, further comprising decomposing the hydrocarbons of the hydrocarbonaceous waste material by high-energy radiation.

11. The method of claim 10, wherein the high-energy radiation comprises UV radiation.

12. The method of claim 1, wherein the step of heating the hydrocarbonaceous waste material is performed by indirectly heating a vessel shell of the dryer.

13. The method of claim 13, wherein the dryer is indirectly heated via microwave radiation.

14. The method of claim 1, further comprising setting a maximum temperature in the dryer based on the waste material, the maximum temperature being selected from the group consisting of 270° C., 300° C., and 350° C.

15. The method of claim 1, further comprising regulating process parameters of the dryer while the hydrocarbons of the hydrocarbonaceous waste material are decomposed, wherein the process parameters of the dryer include at least one parameter selected from the group consisting of movement intensity in the dryer, heating capacity in the dryer, temperature of the hydrocarbonaceous waste material, and a quantitative use of radiation or chemicals to decompose the hydrocarbons of the hydrocarbonaceous waste material.

16. The method of claim 1, further comprising pre-drying the hydrocarbonaceous waste material before introducing the hydrocarbonaceous waste material into the dryer, the pre-drying using at least one process selected from the group consisting of mechanical de-watering, chemical drying, and thermal drying, and the process also producing additional exhaust gas.

17. The method of claim 17, wherein during the predrying, the method further comprising removing highly volatile components from the waste material at low temperature of predrying.

18. The method of claim 16, wherein the hydrocarbonaceous waste material is pre-dried using thermal pre-drying performed at a temperature from 40° C. to 200° C.

19. The method of claim 16, wherein the hydrocarbonaceous waste material is pre-dried using thermal pre-drying performed at a temperature from 90° C. to 110° C.

20. The method of claim 1, further comprising:

de-dusting exhaust gases produced in decomposing hydrocarbons and discharging the exhaust gases from the dryer; and combusting the gases after the de-dusting.

21. The method of claim 19, wherein the combusting step comprises at least one of thermal combustion and catalytic combustion.

22. The method of claim 20, further comprising using energy from the combusting to heat at least one dryer or other device for performing the process.

23. The method of claim 1, further comprising the steps of:

measuring a content of a component of exhaust gas produced by the drying process material while the hydrocarbons are decomposed; and regulating process parameters in accordance with the measured content of the component of the exhaust gas.

24. The method of claim 23, wherein the measured component of the exhaust gas includes at least one chemical selected from the group consisting of carbon monoxide, carbon dioxide, oxygen, hydrogen, and the hydrocarbon content of the exhaust gas.

25. The method of claim 1, further comprising purging the dryer with an inert gas for restricting concentration of at least one of oxygen and hydrogen.

26. The method of claim 25, wherein the inert gas is nitrogen.

27. An apparatus for treating a hydrocarbonaceous waste material, comprising:

a treatment chamber;

an introducing device for introducing the hydrocarbonaceous waste material into the treatment chamber;

a dryer for heating the hydrocarbonaceous waste material inside the treatment chamber;

a treatment device at the dryer and being regulated independently of the heating by the dryer operable for decomposing hydrocarbons of low volatility contained in the waste material into highly volatile hydrocarbons, the hydrocarbonaceous waste material inside the treatment chamber such that lower volatility hydrocarbons of the waste material are decomposed into higher volatility hydrocarbons, wherein the decomposition of the lower volatility hydrocarbons into the higher volatility hydrocarbons produces waste gas;

a discharging device for at least partially discharging the decomposed hydrocarbons from the treatment chamber.

28. The apparatus of claim 27, further comprising a gas line through which the waste gas is discharged after the lower volatility hydrocarbons of the hydrocarbonaceous waste material are decomposed into the higher volatility hydrocarbons by the treatment device.

29. The apparatus of claim 27, wherein the introducing and discharging devices comprise respective conveyer devices.

30. The apparatus of claim 27, wherein the treatment device for decomposing hydrocarbons comprises a conveyor for feeding oxygen or oxygen related carriers into the treatment chamber.

31. The apparatus of claim 27, further comprising a radiation device for irradiating the hydrocarbonaceous waste material in the treatment chamber for decomposing lower volatility hydrocarbons into higher volatility hydrocarbons.

32. The apparatus of claim 31, wherein the radiation device is operable to irradiate the hydrocarbonaceous waste material with UV radiation.

33. The apparatus of claim 27, further comprising a supply line for supplying a carrier gas into the treatment chamber.

34. The apparatus of claim 27, further comprising an agitation device for at least one of moving and agitating the hydrocarbonaceous waste material while the lower volatility hydrocarbons are decomposed into the higher volatility hydrocarbons.

35. The apparatus of claim 27, further comprising a de-dusting device for de-dusting gases emerging from the treatment chamber.

36. The apparatus of claim 35, further comprising a thermally insulated or heated exhaust line coupled to the treatment chamber and to the de-dusting device, the waste gas flowing from the treatment chamber, through the exhaust line, and to the de-dusting device.

37. The apparatus of claim 36, further comprising further devices for treating gases extracted from the dryer.

38. The apparatus of claim 27, further comprising a freely movable body in the dryer operable for detaching caked waste materials in the treatment chamber and for reducing the formation of agglomerates.

39. The apparatus of claim 36, further comprising at least one probe or sensor arranged on at least one of the heated exhaust line and the dryer for measuring the at least one parameter.

* * * * *